United States Patent [19]

Mallia

[11] Patent Number: 5,077,830

[45] Date of Patent: Dec. 31, 1991

[54] METHOD AND APPARATUS TO SELECTIVELY ADDRESS RECIPIENTS AND RECOVER MISSING MESSAGES ON A BROADCAST DISTRIBUTION NETWORK

[75] Inventor: Tony Mallia, Saratoga, Calif.

[73] Assignee: Indesys, Inc., Santa Clara, Calif.

[21] Appl. No.: 535,307

[22] Filed: Jun. 7, 1990

Related U.S. Application Data

[63] Continuation of Ser. No. 156,715, Feb. 17, 1988, abandoned.

[51] Int. Cl.⁵ .............................................. H04B 1/16
[52] U.S. Cl. ........................................ 455/58; 455/70
[58] Field of Search ................................... 455/67–70, 455/53, 54, 56, 58; 340/825.06, 825.5, 825.44

[56] References Cited

U.S. PATENT DOCUMENTS

| | | | |
|---|---|---|---|
| 4,369,443 | 1/1983 | Giallanza et al. | 455/70 |
| 4,513,415 | 4/1985 | Martinez | 455/53 |
| 4,587,652 | 5/1986 | Goldman | 455/58 |
| 4,794,649 | 12/1988 | Fujiwara | 455/70 |

*Primary Examiner*—Curtis Kuntz
*Attorney, Agent, or Firm*—Limbach, Limbach & Sutton

[57] ABSTRACT

The present invention includes a method and apparatus for broadcast distribution of messages and information. Included within the present invention are means for selectively broadcasting messages to specified locales. Further, only the appropriate receiver within that locale operates to receive the message. At the receiver, the message is transmitted to or receivable by the appropriate recipient. In the event that a message is inadvertently lost or transmitted with noise induced errors means are provided for requesting a retransmission of the message.

16 Claims, 5 Drawing Sheets

RECIPIENT TABLE

| NUMBER | RECEIVER | MAILSTOP |
|--------|----------|----------|
| 000000 | 025 | 12 |
| 000001 | 108 | 63 |
| 000002 | 076 | 49 |
| 000003 | 003 | 02 |
| 000004 | 031 | 56 |
| ... | ... | ... |
| ... | ... | ... |
| ... | ... | ... |
| (0 – N) | (1 – X) | (1 – 64) |

RECEIVER TABLE

| RECEIVER NUMBER | PRIVATE NUMBER | BROADCAST STATION |
|-----------------|----------------|-------------------|
| 001 | 4657 | 98.9 |
| 002 | 2983 | 106.5 |
| 003 | 2261 | 99.7 |
| 004 | 8525 | 98.5 |
| ... | ... | ... |
| ... | ... | ... |
| (0 – X) | | |

METHOD AND APPARATUS TO SELECTIVELY ADDRESS RECIPIENTS AND RECOVER MISSING MESSAGES ON A BROADCAST DISTRIBUTION NETWORK

This is a continuation of co-pending application Ser. No. 07/156,715, filed on Feb. 17, 1988, now abandoned.

FIELD OF THE INVENTION

This invention relates to the field of information transmission over a distribution network. More particularly, this invention relates to a method and apparatus for selectively addressing particular recipients and recover missing messages distributed over a broadcast network.

BACKGROUND OF THE INVENTION

In prior art broadcast distribution of information, messages were distributed throughout the network having a distribution list put at the beginning of the header. Each receiving operator is responsible for determining whether or not the message was intended for an individual at that site. Such a practice requires the use of additional user effort to appropriately distribute messages to the intended recipient. Further, for the commercial distribution of information, such as stock quotations or news, no effective method was available for appropriately distributing such information while preventing unauthorized access.

In prior art broadcast distribution of messages, no mechanism or procedure exists for insuring that each message sent has been received. In such a system, a sending user has no knowledge that the message is not received. An intended receiving party has no knowledge that a message was even sent.

SUMMARY OF THE INVENTION

An apparatus and a method are disclosed for the detection and recovery of missing messages and for addressing an intended message recipient in a broadcast distribution network. The network has a plurality of senders, a host, a plurality of broadcast stations, a broadcast distribution medium and a plurality of receivers. Each said receiver services a certain number of the users. Each said user has a specific predefined address.

In order to determine whether a message has been missed by a recipient the invention includes means for forming an appropriate unique sequence number for each message relative to each said receiver. There are means for sending each of the sequence numbers so that it is identified with its appropriate message. The message is received by the receiver. There are means for determining, from the sequence number, whether or not a previous message has been received.

In order to address only those intended message recipients the invention includes a plurality of mailstops at each said receiver, a plurality of private numbers, one said private number for each said receiver and a plurality of broadcast station numbers. There are means for correlating each said intended message recipient to a unique said mailstop and a unique said receiver and means for correlating each said receiver to a unique said private number and to a unique said broadcast station. An address is formed including an appropriate one each of a private number and mailstop. The address is identified with its intended message recipient.

BRIEF DESCRIPTION OF THE DRAWINGS

FIG. 4 shows the data structure of a message header for a message having a single recipient according to the preferred embodiment of the present invention.

DETAILED DESCRIPTION OF THE PREFERRED EMBODIMENT

Figure 1:
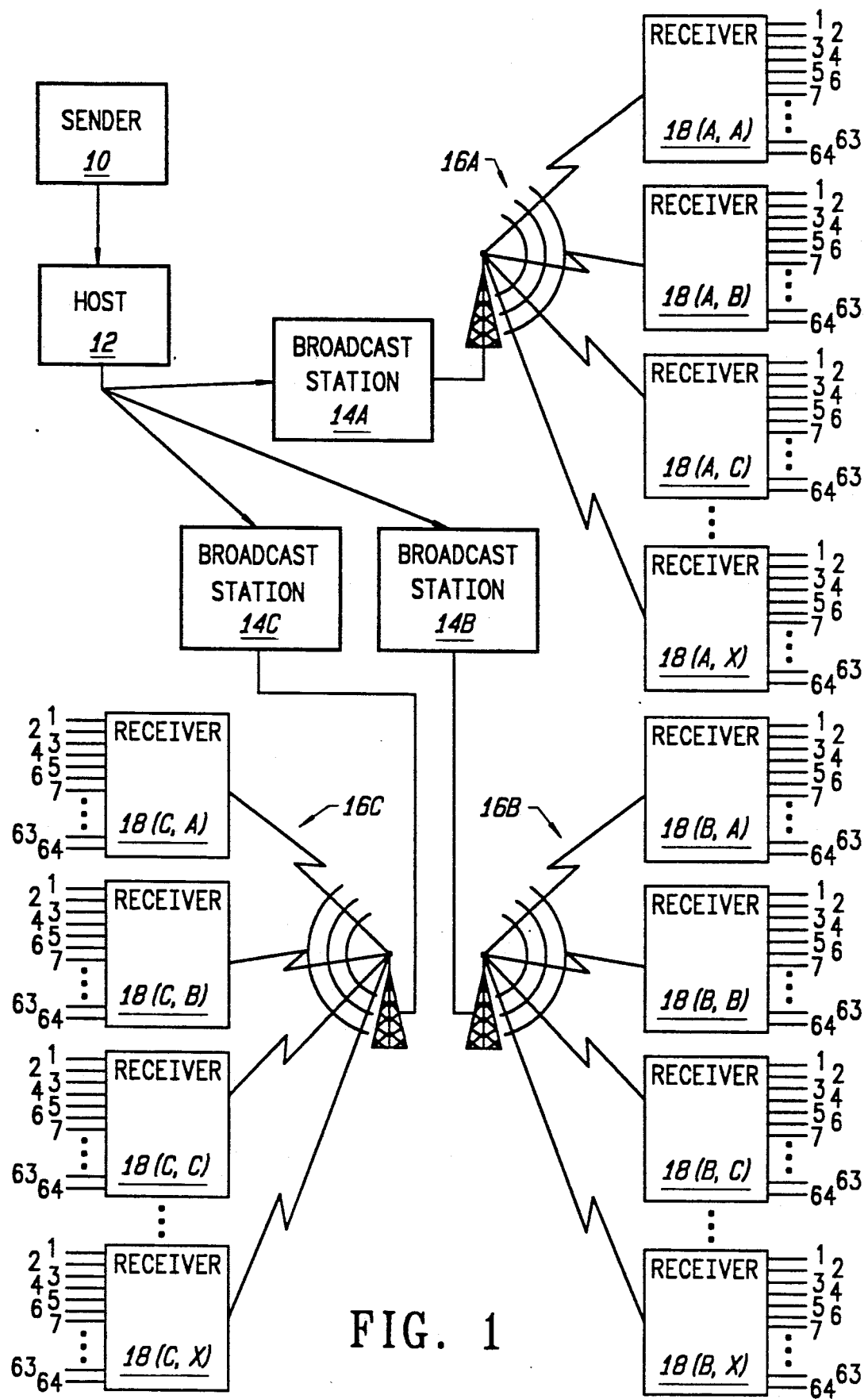
FIG. 1 shows a network for broadcasting information.

FIG. 1 is a block diagram of the broadcast network of the present invention. A sender 10 is coupled to a host 12. The host 12 is coupled to any number of broadcast stations 14. Three broadcast stations 14a, 14b and 14c are shown in FIG. 1. Each broadcast station has a broadcast transmission medium 16. In FIG. 1, the broadcast medium means are denoted with an alphabetic suffix matching that for the broadcast station. Thus, broadcast medium 16a is associated with broadcast station 14a. A number of receivers 18 are associated with each of the broadcast station 14 and broadcast medium 16. Each broadcast station 14 can potentially address any number of receivers 18. Each receiver is given a pair of alphabetic suffixes. The first element of the alphabetic suffix denotes which broadcast station that receiver is associated with. The second portion of the alphabetic suffix denotes which of the receivers for that broadcast station this is. Thus, receiver 18(b,c) is a receiver coupled to receive a transmission from broadcast station b and it is the third ('c'th) such receiver. Each of the receivers is capable of receiving messages for a finite number of recipients. Each recipient has a mail stop at that receiver. In the preferred embodiment, each receiver is capable of receiving messages for 64 individual recipient mail stops.

Sender 10 transmits a message to a host 12. The host 12 operates on a message to determine the correct address for that message. The host 12 then sends the message on to the appropriate broadcast station 14. The broadcast station 14 prepares the message for transmission within the broadcast medium 16. The receiver 18 receives the message out of the broadcast medium 16 for the recipient.

Figure 5:
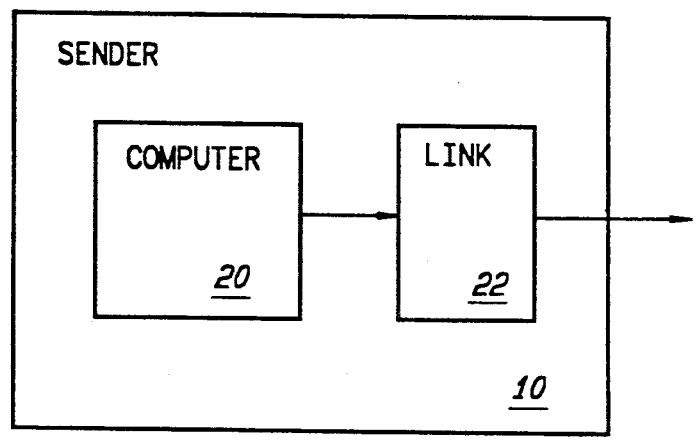
FIG. 5 is a more detailed block diagram showing the sender.

FIG. 5 shows a more detailed block diagram of the sender 10. The sender includes a computer 20 which is coupled to a link 22. The link 22 is shown to be coupled to external circuitry not shown. In FIG. 1 the external circuitry is shown to be the host 12. The user may compose the message on the computer 20. The link 22 may be a modem, a connection to a local area network, a connection to a satellite communications network or the like. In the preferred embodiment, the sender unit 10 is a personal computer having a modem for data transmission.

Figure 6:
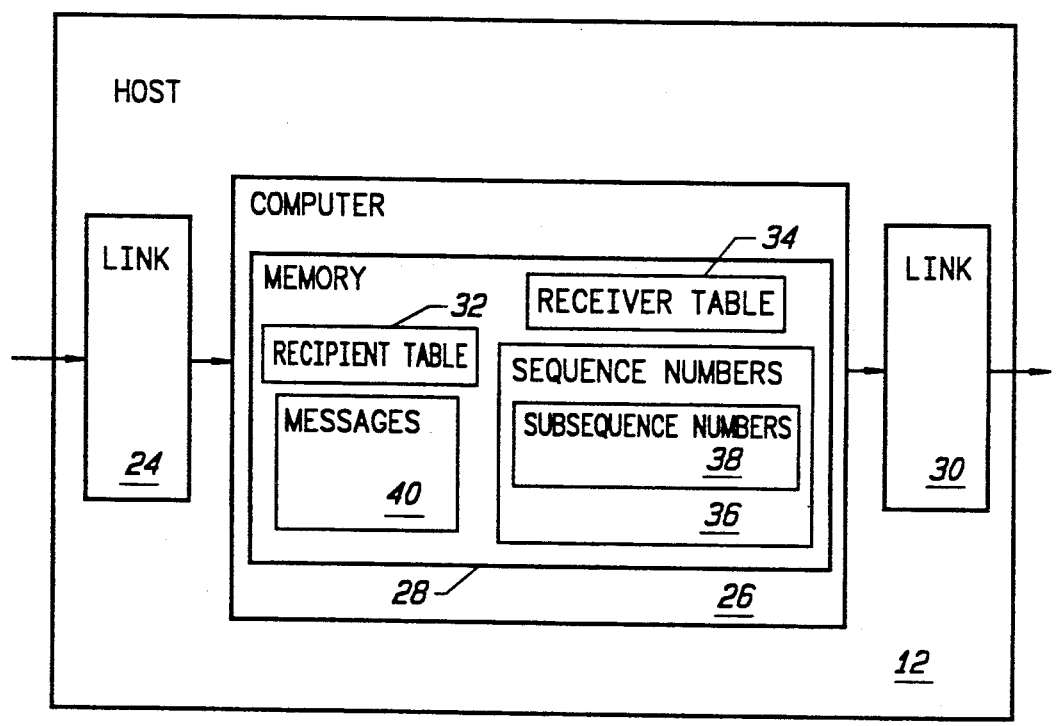
FIG. 6 is a more detailed block diagram showing the host.

FIG. 6 shows a more detailed block diagram of the host 12. The host 12 includes a link 24 which is coupled to receive a message from external circuitry not shown here. In FIG. 1 the external circuitry is shown to be the sender 10. The link 24 is coupled to transfer the message it receives to a computer 26. The computer 26 is coupled to link 30. The link 30 is coupled to external circuitry not shown. In FIG. 1 the external circuitry is shown to be the broadcast station 14. In the preferred embodiment the host 12 is a VAX computer, the link 24 is a modem and the link 30 is a modem. The links 24 and 30 may be the same device operated in receive mode for link 24 and send mode for link 30.

The computer 26 operates on each message to form an appropriate header as described below in connection with FIG. 4. The header includes information describing which receiver(s) and recipient(s) are intended, the length of the message, the sequence number of the message and whether this message has been transmitted before. The computer 26 contains a memory 28. The memory 28 is initialized to store a recipient table 32, a receiver table 34, a list of sequence numbers 36, a sublist of subsequence numbers 38, a message header log and the messages 40.

Figure 7:
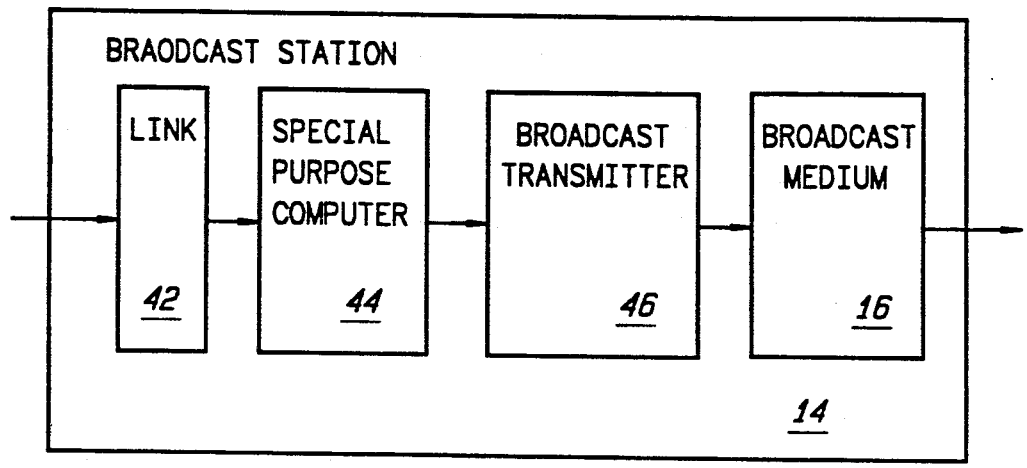
FIG. 7 is a more detailed block diagram showing the broadcast station and broadcast medium.

FIG. 7 shows a more detailed block diagram of the broadcast station 14. Link 42 is coupled to receive a message with header from external circuitry not shown. In FIG. 1 the external circuitry is shown to be the host 12. The link 42 is coupled to transmit the message with header to a special purpose computer 44. The special purpose computer 44 and the broadcast transmitter 46 cooperatively operate on the message and header to translate the information into signals suitable for transmission and over the broadcast medium 16. The special purpose computer 44 translates the message and header. The special purpose computer 44 is electrically coupled to transfer the translated message to the broadcast transmitter 46. The broadcast transmitter 46 appropriately amplifies or attenuates the translated message and transmits the translated message into the broadcast medium 16.

In the preferred embodiment the host 12 communicates with the broadcast station 14 using modems over telephone lines. The link 30 in FIG. 6 and the link 42 in FIG. 7 are modems. The broadcast station 14 is an FM broadcast radio station. The broadcast station 14 transforms binary information received from the host 12 into a signal for transmission by the FM radio station. The broadcast transmitter 46 is a commercial FM radio transmitter. The signals are transmitted via the broadcast medium 16 which are the airwaves. In utilizing an FM radio station, the broadcast medium 16 is the sub-carrier frequency not used for ordinary commercial radio signal broadcasting such as music, news, sports or weather. In alternate embodiments, the broadcast station 14 and broadcast medium 16 could be comprised of a local area network server and local area network, a communications satellite and appropriate radio frequencies or other broadcast networks.

Figure 8:
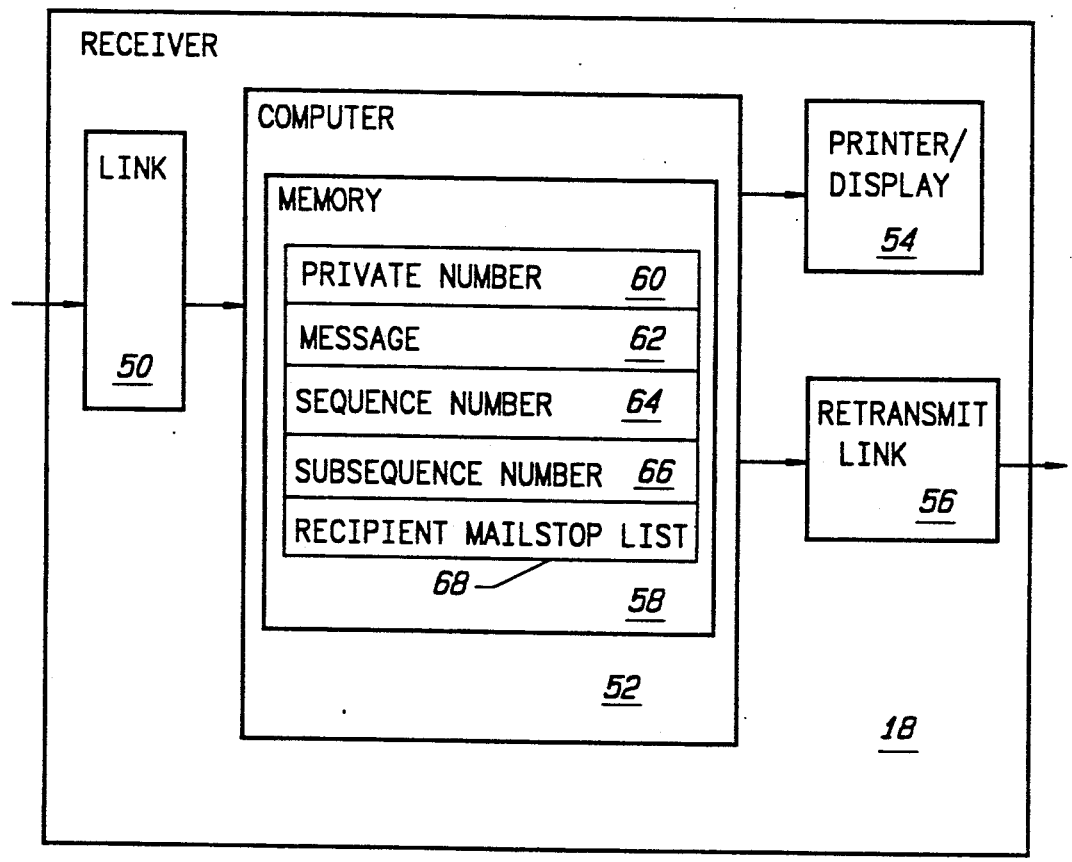
FIG. 8 is a more detailed block diagram showing the receiver.

FIG. 8 shows a more detailed block diagram of the receiver 18. A link 50 is coupled to receive a message from a source not shown. In FIG. 1 the source is shown to be the broadcast medium 16. The link 50 is coupled to transfer the message to a computer 52. The computer 52 translates the message and header back into binary format.

The computer 52 has a memory 58 which includes storage for the receiver's private number 60, the message 62, the sequence number 64, subsequence number 60, the 66 and a local recipient mailstop list 68. The computer 52 considers the information contained in the header to determine whether the message is intended for a recipient at this receiver 18. If so, the computer 52 then determines whether this message has been received before by comparing the sequence number in the header to the sequence number table 64. If not, the computer 52 discards the message packet by packet.

If the message is intended for a recipient at this receiver, the computer 52 couples the message to an output device. The output device can be printer 54 or a serially connected device 54. If, on the other hand, the computer 52 determines that the sequence number table is incomplete it can request retransmission of the message over the retransmit link 56. The retransmit link 56 can be a phone call to the service representative at the host 12 or can be a modem which automatically calls the host receive link 24. In the preferred embodiment the link 50 is a FM receiver, the computer 52 is a microprocessor, the serially connected device 54 is any one of a number of commercially available printers or PC outputs bus. The retransmit link is an operator requesting retransmission of a message which has not been received.

The broadcast network of the preferred embodiment may be used equally well for sending a message to one or many recipients. The sender concatenates a distribution list to the message. The distribution list may include a single name, the user number associated with that name, a list of names, a list of user numbers, or a list designator. The list designator might be "ABC Engineering Staff" and represent a list of all engineers within company ABC.

Figures 2, 3, 4A:
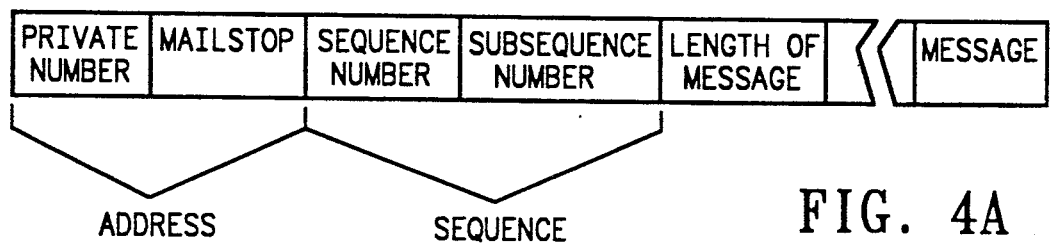
FIG. 2 shows a recipient table according to the present invention.
FIG. 3 shows a receiver table according to the present invention.

The message is transmitted to the host 12 for appropriate consideration. The host 12 maintains a recipient table as shown in FIG. 2 and a receiver table as shown in FIG. 3. Each recipient on the system is assigned a unique recipient number. The recipient table is stored within the host 12 to correlate the recipient number, a receiver number and a mail stop at the receiver for the recipient. Each receiver is assigned a private number and a broadcast station. The receiver table is stored within the host to maintain a list to correlate between the receiver number, the private number and the broadcast station to which that receiver is assigned.

Figure 4B:
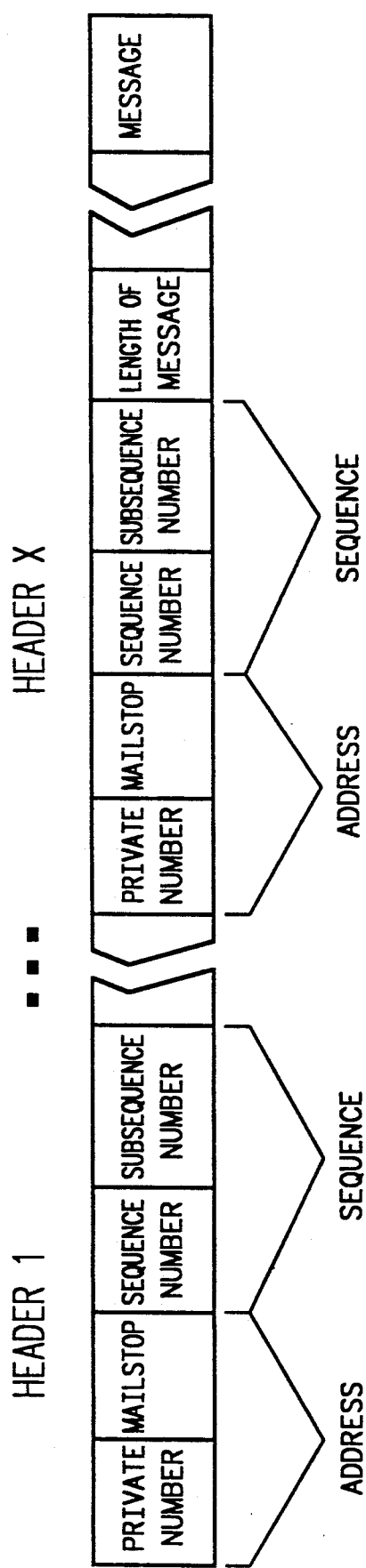
FIG. 4B shows the date structure of a message for a message having multiple recipients according to the preferred embodiment of the present invention.

Once the host 12 receives a message from the sender 10, the host affixes a header to the beginning of the message. The header includes an address of the recipient. The address, shown in FIG. 4A, includes the broadcast station's private number, the receiver number and mail stop of the recipient. In the event that the sender 10 is transmitting the message to more than one recipient, the host 12 affixes one header for each recipient as shown in FIG. 4B.

Each broadcast station 14 and its broadcast medium 16 cover a specific region. When commercial broadcast FM stations are used as the broadcast station 14, the region covered will generally be the geographic area within which the FM signal may be received. The host 12 will only send the message to those broadcast stations 14 covering the regions in which the intended recipients reside.

The broadcast station 14 transforms the message received from the host 12 from binary data into suitable signals for broadcast transmission. The message is transmitted over the broadcast medium 16 to all of the receivers 18a through 18x within the broadcast area for each broadcast station 14. Each receiver 18a through 18x within the broadcast area receives each message sent by the broadcast station 14. Each receiver 18a through 18x considers the header to determine whether or not the message is intended for a recipient having a mail stop at that receiver. If the recipient address includes that receiver, the receiver functions to capture the message for that recipient. The recipient then has the opportunity to view or print the message as desired. However, if the receiver determines that the recipient address is not located at that receiver, the receiver will then disregard the message. In order to ignore false addresses, the receiver will continue to monitor the message in order to determine the end of the present message to accurately identify the next header for consideration.

The host 14 has no way to determine whether or not the message was received by the receiver. To prevent a message which was initially not received from being discarded, a sequence number is assigned to each message. The sequence number is assigned by the host 12 and is included in a first sequence number table at the host 12. Each time a message is sent by the host 12 via the broadcast station 14 and broadcast medium 16 to a particular receiver 18, the sequence number for that receiver is incremented and stored in a second sequence number table at the receiver 15. For example, the first message sent to a particular receiver 18x is assigned a sequence number 0; the second, the sequence number I; the third, sequence number 2, and so on. Each receiver stores the sequence numbers as received.

For example, assume that receiver 18b had received messages with the sequence numbers 0, 1, 2, 3, 4 and 6. From this information, the receiver could determine that a message had not been received. That message has the sequence number 5. A receiver operator can contact a service representative at the host to have the message corresponding to sequence number 5 resent. In the alternative, the receiver can be configured to automatically determine whether a message that has been sent was not received and via a modem line, request the host to resend that message.

Messages may be improperly received because of inadvertent noise signals inherent in the broadcast medium 16 disrupting the transmission. To insure that each message is completely and correctly received, messages are sent multiple times. Once a message, corresponding to a particular sequence number, has been completely and correctly received, that message will be discarded by the receiver on subsequent transmissions.

In the event that a recipient inadvertently erases a message from his storage files, subsequent retransmissions of the message would be discarded. In order that the receiver will not discard wanted subsequent retransmissions of a message even though the sequence number table stored in the receiver showed that message has already been received, a subsequence number is appended to the sequence number. The subsequence number is used for successive transmissions of a message that has already been completely and accurately received. The recipient can contact the host and request retransmission of a particular message. For each subsequent retransmission of such a message, the subsequence number will be incremented. The sequence number table in the receiver will be modified on such a subsequence retransmission to set it to the highest subsequence number received.

An improved method and apparatus for addressing and insuring complete transmission of broadcast messages over a distribution network has been disclosed. Even though the present invention has been disclosed with respect to preferred embodiments, modifications which become apparent to persons skilled in the art after study and review of this patent are deemed to be within the scope and spirit of this invention.

What is claimed is:

1. A broadcast distribution network of the type which includes host sending means for distributing a plurality of messages to a plurality of users, each of said users having a specific predefined address, said network comprising:
   a plurality of receivers, each receiver having a plurality of users;
   a sequence number;
   means for generating the sequence number of each massage corresponding to the receiver intended to receive the message, wherein each sequence number is sequentially generated to represent a count of the number of messages sent to that receiver;
   means for sending the sequence number with its corresponding message from the host to the receiver;
   means for storing the sequence number and its corresponding message in the host for each of the receivers;
   means for storing the sequence number by each receiver for itself by replacing a previously received sequence number;
   means for comparing the sequence number to the previously received sequence number for determining whether each message sent by the sending means has been received by the receiver.

2. The network according to claim 1 further comprising means within the sending means for resending the previous message which has not been received.

3. The network according to claim 2 further comprising means within the receiver means for transmitting a request signal to activate the means for resending a previous message.

4. The network according to claim 3 wherein the means for transmitting the request signal does so automatically upon the detection that a sent message has not been received.

5. The network according to claim 4 wherein the sending means sends each message a predetermined number of times and the receiver means further comprises suppression means for ignoring messages which have already been received.

6. The network according to claim 5 further comprising means for overriding the suppression means.

7. The network according to claim 1 wherein the sending means includes a plurality of commercial, frequency modulated radio stations and means for transmitting the messages on subcarrier frequencies of the main frequencies assigned to the radio stations.

8. The network according to claim 7 wherein each receiver means include a frequency modulated receiver.

9. A method for distributing a plurality of messages form a host to a plurality of users at one or more receivers over a broadcast distribution network, wherein each of said users has a specific predefined address, said method comprising the steps of:
   generating a sequence number for each message corresponding to a receiver intended to receive the message, wherein each sequence number is sequentially generated to represent to a count of the number of messages sent to that receiver;

sending each sequence number with its corresponding message from the host to the receiver;

storing the sequence number and its corresponding message in the host for each receiver;

storing the sequence number in each receiver for itself by replacing a previously received sequence number; and comparing the sequence number to the previously received sequence number for determining whether each message sent by the sending means has ben received by the receiver.

10. The method according to claim 9 further comprising resending the previous message which has not been received.

11. The method according to claim 10 further comprising transmitting a request signal to activate the means for resending a previous message.

12. The method according to claim 10 further comprising automatically transmitting a request signal to activate the means for resending a previous message.

13. The method according to claim 12 further comprising sending each message a predetermined number of times and ignoring messages which have already been received with a suppression means.

14. The method according to claim 13 further comprising overriding the suppression means.

15. The method according to claim 9 further comprising transmitting the messages on subcarrier frequencies of the main frequencies assigned to the frequency modulated radio stations.

16. The method according to claim 15 further comprising receiving each message with a frequency modulated receiver.

* * * * *

UNITED STATES PATENT AND TRADEMARK OFFICE
CERTIFICATE OF CORRECTION

PATENT NO. : 5,077,830　　　　　　　　　　　　　　Page 1 of 2

DATED : December 31, 1991

INVENTOR(S): Tony Mallia

It is certified that error appears in the above - identified patent and that said Letters Patent is hereby corrected as shown below:

On the title page item [75]:

Please correct Inventor: Tony Mallia, Moss Beach, Calif.

In the Specification:

In Col. 2, Line 9, delete "Fig. 4" and replace with --Fig. 4A--.

In Col. 4, Line 4, delete "60, the".

In the Claims:

In Col. 6, Line 20, after "number" delete "of" and replace with --for--.

In Col. 6, Line 21, delete "massage" and replace with --message--.

In Col. 6, Line 63, delete "form" and replace with --from--.

UNITED STATES PATENT AND TRADEMARK OFFICE
CERTIFICATE OF CORRECTION

PATENT NO. : 5,077,830
DATED : December 31, 1991
INVENTOR(S) : Tony Mallia

It is certified that error appears in the above-identified patent and that said Letters Patent is hereby corrected as shown below:

In col. 6, line 17, delete "ben" and replace with --been--.

Signed and Sealed this

Eleventh Day of August, 1992

Attest:

DOUGLAS B. COMER

*Attesting Officer*    Acting Commissioner of Patents and Trademarks